Feb. 20, 1973    D. E. MAYWORM ET AL    3,717,533
METHOD FOR PRODUCING PLASTIC FLEXIBLE
CONTAINERS HAVING PEELABLE SEALS
Filed May 27, 1971
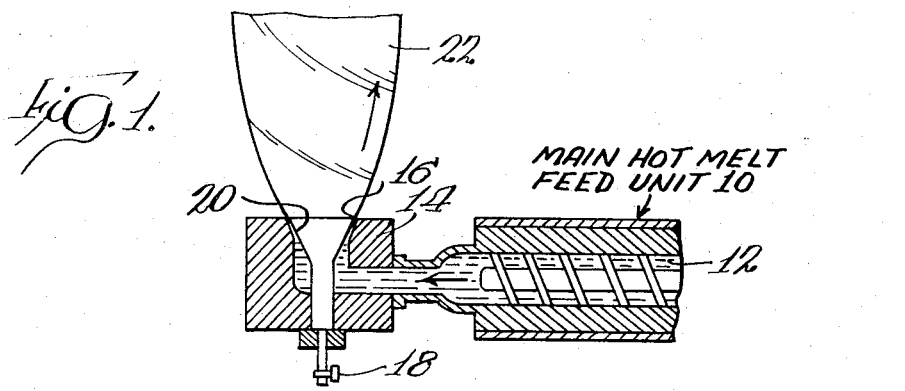
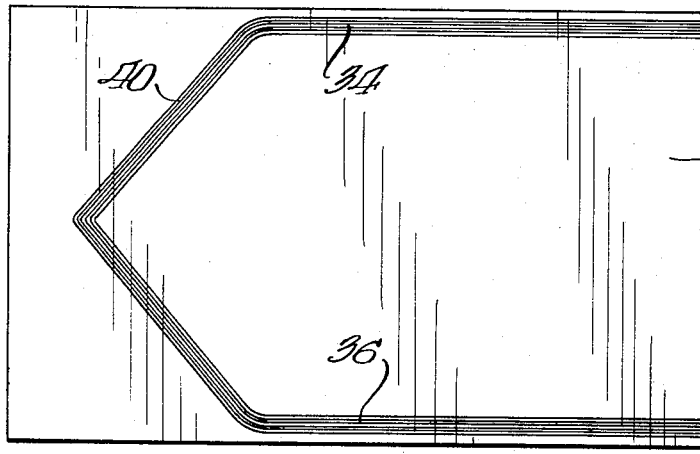
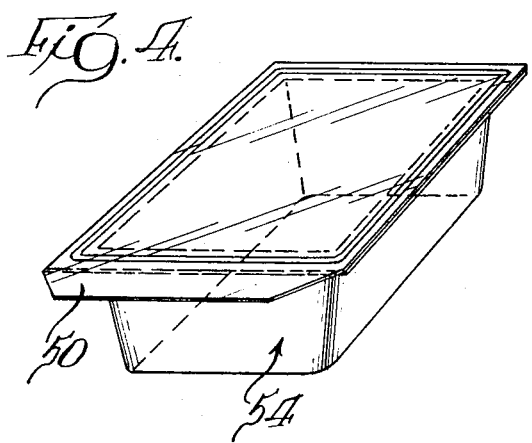
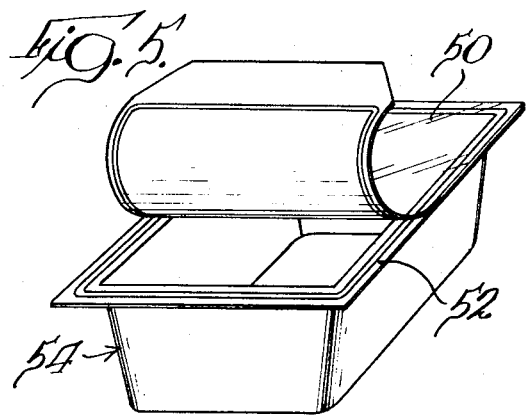
Inventors:
Daniel E. Mayworm
William A. Rohde
By
Gary, Juettner, Pigott & Cullinan
Attys

United States Patent Office 3,717,533
Patented Feb. 20, 1973

3,717,533
METHOD FOR PRODUCING PLASTIC FLEXIBLE CONTAINERS HAVING PEELABLE SEALS
Daniel E. Mayworm, Deerfield, and William A. Rohde, Arlington Heights, Ill., assignors to Tower Products, Inc., Mundelein, Ill.
Continuation-in-part of abandoned application Ser. No. 755,271, Aug. 26, 1968. This application May 27, 1971, Ser. No. 147,341
Int. Cl. B29f 3/01; B32b 31/30
U.S. Cl. 156—244                    4 Claims

ABSTRACT OF THE DISCLOSURE

In a process for forming a cold peelable bond between plastic films, polyisobutylene-modified polyethylene resins provide cold peelable seals after being blow extruded at temperatures higher than normal extrusion temperatures in the presence of oxygen. Various forms of aseptic packages are disclosed in which a peelable seal may be beneficially employed.

BACKGROUND OF THE INVENTION

This application is a continuation-in-part of our copending application Ser. No. 755,271, filed Aug. 26, 1968, now abandoned.

This invention relates to flexible packaging and more particularly to a method for forming a semi-permanent or peelable bond between opposed plies of plastic, in order that an article may be aseptically or otherwise enclosed therein.

Disposable packages enjoy widespread use in the protection of items of commerce. One type of such package is composed of opposed plies of paper, foil or plastic, or combinations thereof, which are bonded around their opposed edges to define an enclosure. An article disposed within such packages may be removed by cutting or tearing through one or more of the bonds to expose the interior of the package. In another type of package, the bond that is formed is sufficiently weak to enable peeling or pulling of the opposed plies away from one another to expose the article within the package.

Packages or pouches which are sealed around their periphery are particularly adapted for use in the medical field. An instrument or other article may be inserted into and sealed within a pouch and may then be sterilized by steam autoclaving or by exposure to a volatile gaseous atmosphere with sporicidal or microbicidal properties, such as ethylene oxide or other known steriliant gases. The package, having a sterile interior, may then be conveniently stored until needed, whereupon the package may be opened to dispense the contents.

In order to assure that the contents of a sterilized package will be dispensed aseptically, many such packages incorporate features to enable peeling of the opposed plies apart by exerting a delaminating force on the unbonded edges of the package. By this procedure, the package may be opened without touching the article to be dispensed. The peelable seal is normally formed by first coating one or both of the facing plies with a special adhesive material or special thermo-responsive resin, and then sealing the plies together along a common line by the application of heat, pressure, or by other known bonding methods. The resulting seal is preferably impervious to outside contaminants but sufficiently weak to allow separation or peelability at room temperatures.

A common type of aseptic package in commercial use comprises a ply or paper sheet which is coated with plastic and peripherally sealed to a ply of transparent plastic film. The paper ply, being quite porous, permits rapid transfer of sterilizing gases into the interior of the package, while the transparent film ply allows for visual inspection of the package contents. Several disadvantages incident to the use of this type of package, however, are related to the porosity of paper and its fibrous nature. The paper may carry bacteria and may also absorb contaminating or bacteria-carrying liquids after sterilization, thereby recontaminating the interior of the package. Also, the tearing or pulling of the paper ply may expose loose fibers or chaff that may fall back into the open package and upon the contained product.

An alternate form of package comprises opposed plastic films composed entirely of an olefin polymer such as polyethylene or modified polyethylene. Such materials are particularly suitable for packaging because of their outstanding mechanical and physical properties, as well as their low cost. An important property of polyethylene films is autoadhesion, whereby bags or similar containers may be formed and closed by automatic processing equipment. Various methods are employed to form bonds between facing plies, most of which involve the application of heat to form a common homogeneous bead of polyethylene between the plies. The bond thus formed, however, is permanent and usually may not be broken by a delaminating force at room temperatures. Plastic packages formed by adjoining autoadhesive bonds, therefore, have heretofore required special modifications to facilitate opening, such as tear lines, perforations, or the like. In order to provide for aseptic opening and presentation of the contained article, however, it would be desirable to provide a seal in a polyethylene package that could be opened by peeling at room temperature.

Accordingly, an object of this invention is to provide a method for producing a totally plastic container having contiguous heat bondable plies that may be peeled apart at room temperatures.

Another object of this invention is to provide a peelable seal between plastic films without employing special or separately applied adhesives or non-adhesives, or the like.

A further object is to provide a method for making a plastic container having peelable seals, wherein the sealed container is impervious to contaminants but subject to sterilization.

Another object is the provision of a process for manufacturing polyethylene films having a modified surface which is particularly adaptable to the formation of peelable seals.

Other objects will become apparent from the following description and appended claims, taken in connection with the accompanying drawing.

SUMMARY OF THE INVENTION

In connection with investigations of autoadhesion of polyethylene films, we have discovered that a peelable seal will be achieved by subjecting the surface of at least one of the films to an oxidizing environment within a particular temperature range significantly above that range employed in a normal film extrusion process. The surface treatment is preferably undertaken in conjunction with the extrusion process wherein the internal bubble or inflating medium contains oxygen. Thermally sealed containers having at least one ply of polyethylene film with its treated surface in contact with another treated or untreated surface have been found to exhibit the desired peel characteristics.

THE DRAWING

FIG. 1 is a diagrammatic illustration partly in section of an extrusion apparatus that may be used in connection with the method of the presently described invention.

FIG. 2 is a plan view of a pouch made in accordance with the present invention.

FIG. 3 is a sectional view taken substantially along section line 3—3 of FIG. 2.

FIGS. 4 and 5 are perspective views of another container having a peelable seal formed in accordance with the present invention.

DESCRIPTION OF THE PREFERRED EMBODIMENT

The initial step of the presently described process comprises subjecting a film of a polyethylene to an oxidizing atmosphere at a temperature significantly above the temperature at which the film is normally extruded. High density or high molecular weight polyethylene may be employed in the initial step, but the preferred material is a mixture of a major portion of high density polyethylene and polyisobutylene, in sufficient quantities to promote a degree of elasticity in the film, said quantities usually falling within the range of 10 to 55 percent. Optimum results are achieved if the amount of polyisobutylene present is approximately 28 to 42 percent of the total mixture. Commercially available forms of polyisobutylene-modified polyethylene include "Plaskon 2204" (Allied Chemical Company).

FIG. 1 illustrates a typical blow extrusion apparatus comprising a hot melt feed unit 10 for introducing the molten polyethylene mixture 12 into the orifice of an annular die 14 wherefrom the material issues upwardly through ring-shaped lip 16 in the die. At the same time, a gaseous inflating medium is introduced through a line 18 and into a funnel-shaped outlet 20 disposed centrally with the ring of the lip. The gaseous medium serves to inflate the hot melt into an elongated cylindrical form 22. In this manner a film of the required thickness is attained, depending upon the pressure of the medium and the rate of withdrawal of the extrudate. The conventional recommended temperature range for the extrusion of polyethylene or modified polyethylene mixed with polyisobutylene in such an apparatus is about 380 to 420 degrees F. at the die. Also, the recommended inflating medium in conventional techniques is an inert gas, such as nitrogen or argon, in order to prevent oxidation of the inner surface of the polyethylene tubing.

In contrast to the above, we have discovered that novel peel characteristics may be imparted to the film if the die temperature is maintained between 515 and 575 degrees F., while at the same time air (19 to 22 percent by volume oxygen) is substituted for the inert gas as the gaseous inflating medium. We have also discovered that a somewhat lower die temperature may be employed to obtain good peel characteristics if the proportionate amount of oxygen is increased. For example, if argon containing 40 percent of oxygen is used as an inflating medium, good peel characteristics may be obtained if the die temperature is maintained at about 500 to 510 degrees F. We have also found that the temperature of the atmosphere generally surrounding the tube extrudate has a direct effect on the extrusion temperatures required to produce the desired product. Generally, the die may be maintained at a lower temperature in the above range if the room temperature is above normal. For example, at a room temperature of 76 to 80 degrees F., the optimum die temperature range is about from 540 to 560 degrees whereas a die temperature of about 520 to 540 degrees is normally sufficient if the room temperature is about 95 to 100 degrees.

It has been found that surface oxidized or degraded films fabricated in accordance with the invention exhibit sufficient autoadhesion to form an impervious seal when bonded on conventional heat bonding equipment at a temperature between 250 and 400 degrees F., preferably at 370 degrees for a duration of about one to two seconds. At the same time, the bond may be easily broken and the plies may be peeled apart at room temperatures. If the film is extruded at temperatures below 515 degrees with air, subsequent heat bonding will produce a weld seal or one which requires excessive effort to peel at room temperature. At extrusion temperatures above 575 degrees, it has been found that the plies will not exhibit sufficient autoadhesion to form a stable bond.

It will be noted that only the interior surface of the film is modified in the extrusion process, with the bulk of the film remaining unaffected, retaining all of its desirable chemical and physical qualities. The oxygenated inflating medium is enclosed within the cylindrical extrudate, whereby the inside surface thereof is cooled at a relatively slow rate. The outside surface of the extrudate is cooled more quickly by the surrounding atmosphere, and such surface does not exhibit desired peel characteristics at the specified temperature range. In general, it is believed that the high degree of oxidation or degradation of the internal tube surface limits the bond of the subsequent heat seal to the interface of the plies and prevents the formation of a homogeneous mass that is characteristic of a true heat seal or weld, although theories on the mechanism involved are not intended as limitations with respect to the present invention.

It has also been found that the surfaces of films which have been treated in accordance with the present invention may be bonded to the untreated surfaces of other conventionally extruded films containing a major portion of polyethylene, such as high or low density transparent polyethylene films, as well as the edge surfaces of polyethylene containers. Suitable peelable bonds may also be formed with related materials, such as polyethylene-ethylene vinyl acetate copolymers.

FIGS. 2–5 show two types of containers which embody one or more piles made in accordance with the presently described process. The pouch of FIGS. 2 and 3 is shown to comprise a pair of opposed plies 30 and 32, wherein the contiguous surfaces of the plies have been treated in accordance with the present invention. The free edges of the plies are heat sealed along lines 34 and 36, and the pouch may have an open end 38 for insertion of an article or material followed by subsequent sealing. In order to provide sterile access to the package, a V-shaped seal 40 may be provided adjacent the other end of the pouch, said seal merging with the seals 34 and 36.

In the manufacture of the pouch described above, one of the plies may be composed primarily of a low density polyethylene or a high density polyethylene having untreated surfaces, the only requirement being that one contiguous surface of the pouch be treated in accordance with the present invention.

Referring to FIG. 2, it may be seen that each seal line preferably comprises three separate but closely spaced lines of seal, in order to assure an absolute barrier to contaminants without unduly affecting the peel characteristics.

FIGS. 4 and 5 illustrate another container wherein the treated surface of a film 50 is heat bonded to an outwardly extending flange 52 surrounding the open top of a container 54. After the container 54 is filled, the film 50 is placed over the open top and heat sealed to the flange as shown in FIG. 4. Preferably, the film 50 has an overhanging portion to facilitate peeling of the film away from the container, as shown in FIG. 5.

Although we have shown and described a preferred embodiment of our invention, it will be understood by those skilled in the art that changes may be made in various details thereof without departing from the scope of the appended claims.

We claim:

1. A process of forming a peelable seal between surfaces each containing a major proportion of polyethylene comprising the steps of blow extruding, in the form of an inflated tubular film, molten high density polyethylene containing 28 to 42 percent polyisobutylene at a melt temperature between about 515 to 575 degrees F. with the surrounding atmosphere being at normal room temperature, while inflating the extrudate with air to modify the interior surface of the tubular film and leaving the bulk thereof unaffected, then cooling the film to room temperature, and then thermally bonding the modified surface of said film to the surface of an article containing a major proportion of polyethylene, followed by cooling the bond thus formed to result in a seal that is peelable at room temperature.

2. The process of claim 1 wherein said modified surface is thereafter bonded to a similar modified surface.

3. The process of claim 1 wherein said modified surface is thereafter bonded to a flange extending around the open top of a container composed of a major portion of polyethyelne.

4. The process of claim 1 wherein the melt temperature is maintained between about 540 and 560 degrees F.

References Cited

UNITED STATES PATENTS

| | | | |
|---|---|---|---|
| 3,458,378 | 7/1969 | Ambros et al. | 156—244 |
| 3,467,565 | 9/1969 | Utz | 156—497 |
| 3,554,833 | 1/1971 | DeVries et al. | 156—244 |
| 3,496,061 | 2/1970 | Freshour et al. | 156—306 |
| 3,491,935 | 1/1970 | Trotter et al. | 156—306 |
| 3,313,642 | 4/1967 | Waugh | 264—22 |
| 3,575,762 | 4/1971 | Goehring et al. | 156—244 |
| 3,578,527 | 5/1971 | Sakata et al. | 156—244 |
| 3,339,234 | 9/1967 | Utz | 156—244 |
| 3,299,181 | 1/1967 | Coover et al. | 260—897 A |
| 2,854,435 | 9/1958 | Briggs et al. | 260—897 A |

ROBERT F. BURNETT, Primary Examiner

G. W. MOXON II, Assistant Examiner

U.S. Cl. X.R.

156—306, 497; 229—48 T, 51 W B; 264—83, 88